Aug. 7, 1934.　　　　　L. R. GRUSS　　　　　1,969,508

SHOCK ABSORBER

Original Filed Feb. 11, 1931

INVENTOR
LUCIEN R. GRUSS

BY John A. Bommhardt
ATTORNEY

Patented Aug. 7, 1934

1,969,508

UNITED STATES PATENT OFFICE 1,969,508

SHOCK ABSORBER

Lucien R. Gruss, Cleveland, Ohio

Application February 11, 1931, Serial No. 515,043
Renewed January 10, 1934

4 Claims. (Cl. 267—64)

In my pending application Serial No. 443,815 filed April 12, 1930 there is disclosed a shock absorber the characteristic features of which are a main or high compression chamber in which air is maintained at a practically constant pressure, another compression chamber, and an intermediate transfer chamber, the said chambers containing a floating piston by the movements of which air is supplied or transferred from one to the other in operation.

The object of the present invention is to provide an improved form of the device, characterized particularly by a construction which utilizes oil in addition to the air, this oil acting to seal the parts at times and to produce a perfect variable support for the air in the high pressure chamber, to keep the air pressure uniform or equalized.

A further object of the invention is to provide an oil seal for the packing, which serves as an air trap and presses on the cup leather and keeps it tight. Also the rise and fall of the oil level equalizes the pressure in the high pressure chamber.

A further object of the invention is to provide means for producing a recoil check or device, by means of an oil cylinder or receptacle at the bottom of the device, the flow of oil being controlled by a check valve and bleed port arrangement.

The effect of the use of a sufficient quantity of oil is to increase the cushioning effect, and generally to improve the action of the device.

The above named and other features and advantages of the invention will more fully appear from the following specification, reference being had to the accompanying drawing, in which.

Figure 1:
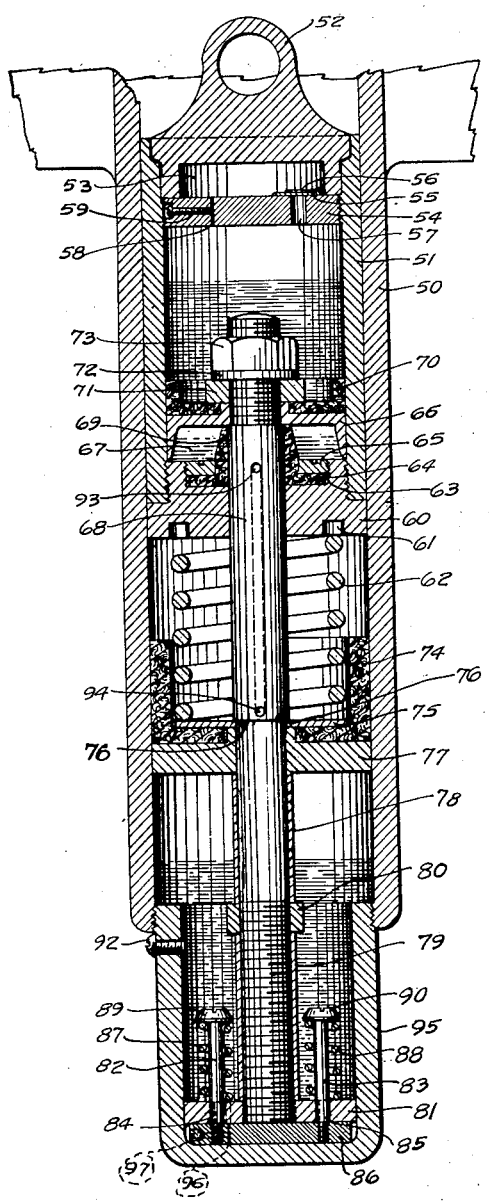
Fig. 1 is a vertical section of one form of the device.

Referring to Fig. 1, the outer cylinder casing indicated at 50 is fixed to the structure on which the shock absorber is to be used and retains within its walls the cylinder 51 closed at the top by a cap 52 which may be brazed into position and which has a circular recess or air trap 53 in the under side, which is formed by cap 52 fitting tightly against the plug 54 which is screwed into the threaded portion of the cylinder 51 before brazing. The cap will be connected to any suitable operating lever or device. The plug 54 has a valve 55 with spring hinge 56 mounted upon its upper surface directly above the aperture or air passage 57. Air forced through the passage 57 presses the valve 55 open allowing the air to escape into the trap, then as the pressure is released the valve 55 closes and the air returns slowly through an air bleed port 58, the flow being adjusted by a screw 59 before assembling, the screw head then being covered with solder or the like to maintain the same flow. A cylinder head 60 is screwed into the lower threaded portion of the cylinder 51 and is grooved at 61 for the spring 62 and tapped at 63 for the cup leather 64 which is retained by the metal ring 65 screwed into the top of the cylinder head 60. The piston head 66 is cupped on the under side to form an air chamber 67, said piston head being screwed on the piston rod 68 until it rests upon the upper shoulder 69 of the piston rod. The cup leather 64 is tapered at the top and acts as a packing wall as the piston rod 68 moves up and down in operation. An upper cup leather 70 is retained on the upper surface of the piston head 66 by a retaining ring 71, washer 72 and a nut 73. A spring 62 around the piston rod 68 rests inside of a cup leather 74 and disc 75 held in position against a lower shoulder 76 by the lower piston head 77, tubes 78 and 79 and a nut 80 screwed on piston rod 68.

Screwed into the threaded end of the cylinder casing 50 is a recoil cylinder 95 into which the piston rod 68 extends, and upon the end of which a recoil piston head 81 is screwed. Pins 82 and 83 protrude through holes 84 and 85 in the recoil head 81 and are screwed into a disc 86, springs 87 and 88 being mounted on the pins 82 and 83 between the flanged heads 89 and 90 and the recoil head 81. Said head also has a plurality of oil passages as shown at 91. The combination of the recoil piston head 81, the pins 82 and 83, the springs 87 and 88 and the disc 86 act as a check valve operating in oil within the recoil cylinder 95. A priming screw 92 may be used in the recoil cylinder 95. The ports 93 and 94 open at opposite ends of a passage in the rod 68 and operate as follows: the upper port 93 is normally sealed by the packing 64 in the cylinder head 63, but may be uncovered by the downward movement of the cylinder 51 or the relative upward movement of the piston rod 68. When the port 93 is uncovered it opens into the transfer chamber 67, allowing the air pressure to build up therein and form a cushion as described in my said patent. There is a bleed port 96 with adjusting screw 97 in the disc 86, the bleed port being just below one oil passage 91.

Figure 2:
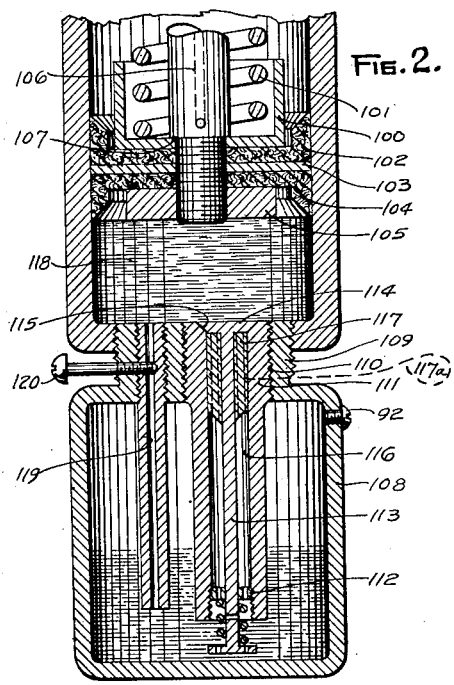
Fig. 2 is a partial vertical section of a modification.
Figure 3:
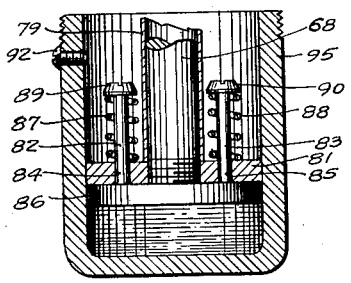
Fig. 3 is a detail of parts shown in Fig. 1, in a different position.
Figure 4:
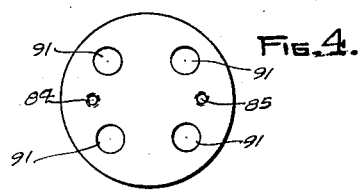
Fig. 4 is a plan of the recoil piston head.

The modification shown in Fig. 2 indicates a manner in which a substitution may be made in the lower piston head of a metal cup 100 which retains the spring 101 and seats on the upturned cup leather 102, the washer 103 and inverted cup leather 104 all being retained in position by the head 105 screwed on the threaded end of the piston rod 106 which presses the inner surface of the metal cup 100 against the shoulder 107 of the piston rod 106. A recoil cylinder 108 may be substituted for the recoil cylinder 95, the neck 109 having an eccentric aperture 110 which is tapped for a suction tube 111 into the base of which is turned a spider 112 through which a valve rod 113 operates. The action of the piston rod 106 as it moves upward within the cylinder, causes a suction which draws the valve rod 113 up until the head 114 is elevated above the seat 115 in the suction tube 111, thus drawing oil up through the apertures in the spider 112, into the passage 116 and out through the apertures 117a in the upper spider 117 and into the oil chamber 118; as the piston rod 106 moves downward the pressure of the oil forces the valve head 114 to again rest on the seat 115 thus closing the oil passages and forcing the oil to drain slowly through the bleed port plug 119 which is screwed into a tapped aperture in the neck 109, the flow of oil being adjusted by the adjusting screw 120.

Any one of the forms above described may be used for various purposes, for example on a motor vehicle, on aeroplanes, on railway cars, elevators and anywhere a shock absorbing device is applicable or desirable. Thus the casing 50 may be as shown attached to some part of the structure to which the shock absorber is applied, and for connecting the cylinder, the lugs 52 may be attached either directly or by the use of levers and rods to parts which move relatively to each other, and since the particular means of connection is immaterial no description thereof is considered necessary.

I claim:

1. In a shock absorber, the combination of a casing, a hollow cylinder having a head, working in said casing, a floating piston assembly comprising a rod working through said head, a piston head on one end of the rod, working in the hollow cylinder and a piston head on the rod working in the casing below the head of the hollow cylinder, the rod having a passage controlled by its movements to transfer oil and air between the spaces on opposite sides of the cylinder head, the cylinder having in one end thereof an air chamber, a check valve opening from the interior of the cylinder into said chamber, and a bleed port connecting said chamber and said interior of the cylinder.

2. The combination stated in claim 1, and a recoil chamber at one end of the casing, containing oil subject to pressure variations by movement of the floating piston assembly.

3. The combination stated in claim 1, and a recoil chamber containing oil and communicating with a space in the casing below the lower piston head, and having a check valve and bleed port controlling said communication.

4. The combination stated in claim 1, and a recoil chamber containing oil and forming an extension on the casing, and a piston in said recoil chamber connected to the floating piston assembly and movable therewith, said piston having a check valve and bleed port to permit transfer of oil to opposite sides thereof.

LUCIEN R. GRUSS.